(12) United States Patent
Cinciu

(10) Patent No.: US 8,231,114 B2
(45) Date of Patent: Jul. 31, 2012

(54) MECHANICAL CONTROL SHOCK-ABSORBENT ANTI-RECOIL UNIVERSAL MECHANISM

(75) Inventor: Vasile Cinciu, Bucharest (RO)

(73) Assignee: Century International Arms Corporation, Delray Beach, FL (US)

( * ) Notice: Subject to any disclaimer, the term of this patent is extended or adjusted under 35 U.S.C. 154(b) by 679 days.

(21) Appl. No.: 12/066,631

(22) PCT Filed: Sep. 12, 2006

(86) PCT No.: PCT/RO2006/000019
§ 371 (c)(1),
(2), (4) Date: Mar. 12, 2008

(87) PCT Pub. No.: WO2007/046724
PCT Pub. Date: Apr. 26, 2007

(65) Prior Publication Data
US 2008/0258363 A1  Oct. 23, 2008

(30) Foreign Application Priority Data
Sep. 13, 2005 (RO) .................................. 2005-00773

(51) Int. Cl.
*F16M 13/00* (2006.01)
(52) U.S. Cl. .......................................... 267/136; 42/74
(58) Field of Classification Search .................. 89/44.01, 89/44.02; 248/584–595; 42/74; 267/136, 267/137
See application file for complete search history.

(56) References Cited

U.S. PATENT DOCUMENTS

| 920,135 | A | * | 5/1909 | Harrod, Joel E. | 248/584 |
|---|---|---|---|---|---|
| 1,550,944 | A | * | 8/1925 | Beidler et al. | 248/586 |
| 1,893,295 | A | * | 1/1933 | Le Bailly | 248/586 |
| 2,277,875 | A | * | 3/1942 | MacBeth | 248/595 |
| 2,731,753 | A | | 1/1956 | Mathieu | |
| 2,867,399 | A | * | 1/1959 | Alexeff | 248/589 |
| 3,118,643 | A | * | 1/1964 | Suozzo | 248/589 |
| 3,207,496 | A | | 9/1965 | Hrebicek | |
| 3,604,138 | A | | 9/1971 | Wilson | |
| 3,754,344 | A | | 8/1973 | Spiliotis | |
| 4,497,466 | A | * | 2/1985 | Perrier | 248/588 |
| 5,211,369 | A | * | 5/1993 | Hoerner | 248/588 |
| 5,752,339 | A | | 5/1998 | Bentley et al. | |
| 5,974,718 | A | | 11/1999 | Bentley et al. | |

FOREIGN PATENT DOCUMENTS

EP 135107 A1 * 3/1985
WO WO 2006/101410 A1 9/2006

OTHER PUBLICATIONS

International Search Report and Written Opinion of the International Search Authority of International Application PCT/Ro 2006/000019, mailed May 15, 2007.

* cited by examiner

*Primary Examiner* — Robert A Siconolfi
*Assistant Examiner* — Stephen Bowes
(74) *Attorney, Agent, or Firm* — Hershkovitz & Associates, LLC

(57) ABSTRACT

Mechanical control shock-absorbent anti-recoil mechanism intended for various fields such as industrial and civil constructions, machine building industry, robotics et cetera, its purpose being to protect against the impact forces, recoil forces or vibrations.
The mechanical control shock-absorbent anti-recoil mechanism comprises a mobile holder X, a joint lever and spring mechanism Y and an end holder Z.
The mechanical control shock-absorbent anti-recoil mechanism has the role of absorbing and a cancellation of the impact forces and recoil forces, while a mechanical control mechanism K adjust concomitantly and continuously the tension of the absorbent springs and the annulling springs in order to decrease or to annul the impact force.

4 Claims, 9 Drawing Sheets

MECHANICAL CONTROL SHOCK-ABSORBENT ANTI-RECOIL UNIVERSAL MECHANISM

CROSS-REFERENCE TO RELATED APPLICATIONS

The present application is a national stage application under 35 U.S.C. §371 of International Application No. PCT/RO2006/000019 with an international filing date of Jul. 3, 2007, and claims priority of Romanian application 2005 00773 filed Sep. 13, 2005.

BACKGROUND OF THE INVENTION

1. Field of the Invention

The invention refers to a mechanical control shock-absorbent anti-recoil mechanism, intended for industrial and civil constructions, machine building industry, defense industry, robotics, etc., its purpose being to protect against the impact forces, recoil forces or vibrations that occur in an instantaneous manner or under operation.

2. Discussion of Background Information

There are known shock-absorbent anti-recoil mechanisms that are equipped with springs, telescopic means, hydraulic brakes, magnetic brakes etc. These mechanisms have the disadvantage that they do not provide neither an multiple applicability nor possibilities to adjust the effect of the impact forces acting on construction, firearm etc., that occur in an instantaneous or a controlled manner, under the action of the outer impact forces, a recoil or vibrations.

Also, are known joint lever and spring mechanisms, as e.g. the U.S. Pat. No. 5,211,369, EP 0135107, U.S. Pat. No. 3,118,643 (Souzzo) or U.S. Pat. No. 4,497,466 (Perrier), these have an configuration, presenting levers and compression springs, of extension, etc having compositions which do not present the possibility of using thereof in reception systems of absorption and cancelation of some shock or recoil forces. The patents known in the above cited prior art, are considering their use in domains of heat carrier transport, in domain of the pantographic devices, to maintain the parallelism of the pipelines against a plan, or of the parallelism between the pipes which transport heat carrier that puts to the dilatations of thereof.

The above mentioned patents have not multiple use, they are only required for protection of some pipelines against dilatations, and their configuration does not allow to be used for reception of shock or recoil forces.

There are also known anti-recoil mechanisms which are able to overtake the recoil energy of the portable firearms. These mechanisms have also the disadvantage that they do not provide multiple applicability, while the component parts of the some assemblies or subassemblies complicate their construction and increase the cost price of the product.

The technical problem that the invention solves consist in the achievement of a mechanical control shock-absorbent anti-recoil mechanism which has a simple construction, needs an easy access fabrication technology, ensures an use and an important effect of decreasing or even cancellation of the impact forces or of the recoil forces, so that the cancellation of said impact forces or recoil forces which occurs instantaneously or under controlled action be achieved in a continuous manner, according to the protection requirement that is imposed on the operation of the construction, machine, equipment or firearm.

SUMMARY OF THE INVENTION

The mechanical control shock-absorbent anti-recoil mechanism, according the invention, solves the technical problems and removes the above-mentioned disadvantages in that: a mobile holder X, that comprises a joint spindle, a connecting screw and an gliding holder provided in the top with an guide longitudinal hole, two threaded holes and a joint cross hole executed in the pushing shoulder, in which penetrate a joint pin which form a joint coupling jointed with a joint lever and spring mechanism, which, at the posterior side, is elastically connected with an end holder Z. The joint lever and spring mechanism Y comprises: four levers with reduced length provided at both ends with passing and joint holes, and in the middle another passing and joint hole, four levers with greater length provided at the previous ends with each a passing and joint hole each, in the middle with another passing and joint hole, and at the posterior ends with two passing and joint holes each, the elastic connection between the mobile holder and the joint lever and spring mechanism is one by the joint pin that penetrates in the pushing shoulder hole, and by the passing and joint holes from the ends of the levers with reduced length, which attaches right—left on the joint pin and are assured by the locks, forward through passing and joint holes existing in the middle of the levers with reduced length penetrate two spring-seat joint pins, which receive from the right—left side, the ends with passing and joint holes existing at the four levers with greater length, these are assured by locks, making a joint coupling, the spring-seat joint pins have provided at the ends passing holes wherein penetrate the ends of the two absorption springs placed right—left side. The levers with reduced length have at the ends passing holes wherein penetrate spring-seat joint pins on top and bottom, wherein penetrate locks, and with passing holes, wherein penetrate the ends of the two absorption springs placed right—left side, forward the levers with greater length, intersect in the middle, where are executed passing and joint holes wherein penetrate the joint pin, wherein penetrate locks, forming thus in the right side a figure in form of deformable rhomb, and in the left side an variable angle ($\alpha$), the posterior free ends of the levers with greater length have provided four passing and joint holes through which penetrate spring-seat joint pins, passing holes wherein penetrate the ends of two absorption springs placed right—left side, and the ends of other four cancellation springs, placed right—left side, these make the joint connection with an end holder Z, which is composed of a mounting and adjusting key on which is supported the edges of the ends of the levers with greater length.

The mechanical control shock-absorbent anti-recoil mechanism resolves the problems stated above in that: an end holder, formed of an base holder which at the ends have provided penetrated longitudinal holes, equidistant central passing holes, penetrated central hole, screwed holes longitudinal equidistant, screwed holes cross equidistant, a guide seat, two spring-seat screw spindles with penetrated holes at the ends wherein penetrate the ends of the four cancellation springs placed right—left side, a spindle provided at the end with a screw, which penetrate in the superior longitudinal passing hole, that it passes, it bears two compression springs between which is placed an spacer, the end of the screwed spindle passes the superior longitudinal hole of the gliding holder, and maintain an parallelism with the joint lever and spring mechanism through the joint connection, the screwed end of the screwed spindle make common body with the body subjected to the shock or recoil forces, two clamping screws, and on the bottom through the penetrated longitudinal hole wherein penetrate a connecting screw with fixation role of the end holder by the body subjected to the shock or recoil forces.

The mechanical control shock-absorbent anti-recoil mechanism resolves the problems stated above in that: a mechanical adjusting mechanism K composed of: triple nut longitudinal passed of: two equidistant screwed holes, a central penetrated screwed hole, a central screw, provided at one end with a mouthing, at the other end is provided an adjusting key, in the guide seat penetrate the triple nut and the screwed pin of the central screw, of which processed end penetrate in the central penetrated hole, being assured by a lock, in the right side of the central holder is positioned a mounting and adjusting key provided with cross screwed holes wherein penetrate two pins with screwed ends with different diameters, the ends with reduced diameters penetrate through the equidistant central passing holes screwed up in the equidistant screwed holes of the triple nut, forming thus a fixed connection between the triple nut and the mounting and adjusting key, on which is supported the edges of the ends of the levers with greater length between which is formed a variable angle ($\alpha$).

The mechanical control shock-absorbent anti-recoil mechanism according to the invention has the following advantages:
- it can be adjusted according to the impact or the recoil force, so that the effects thereof is decreased;
- it can be used in the field of the civil constructions, industrial constructions, machine construction industry and defense industry.

BRIEF DESCRIPTION OF THE DRAWINGS

In the following, the invention is described by an embodiment example in connection with accompanying drawings 1 to 13 in which.

DETAILED DESCRIPTION OF EMBODIMENTS

Figure 1:
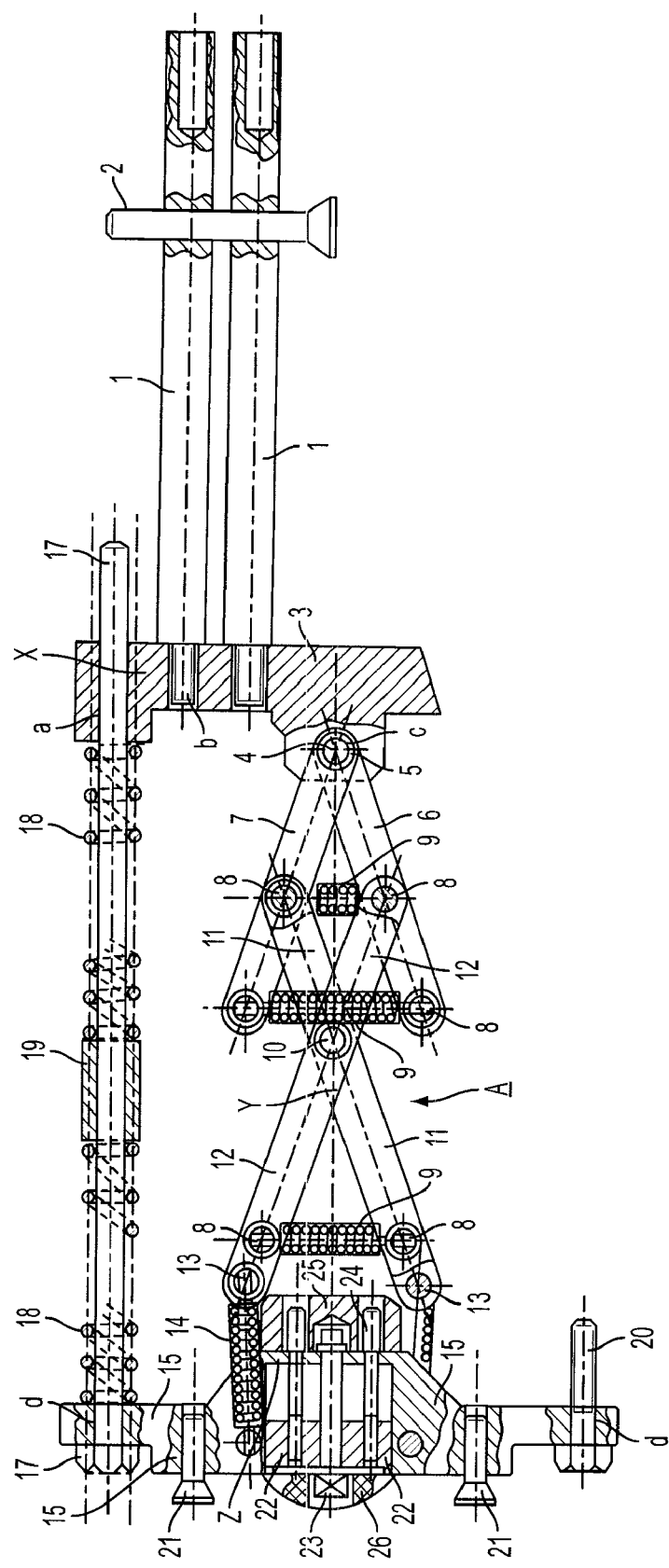
FIG. 1 is a longitudinal section of the mechanical control shock-absorbent anti-recoil mechanism.
Figure 2:
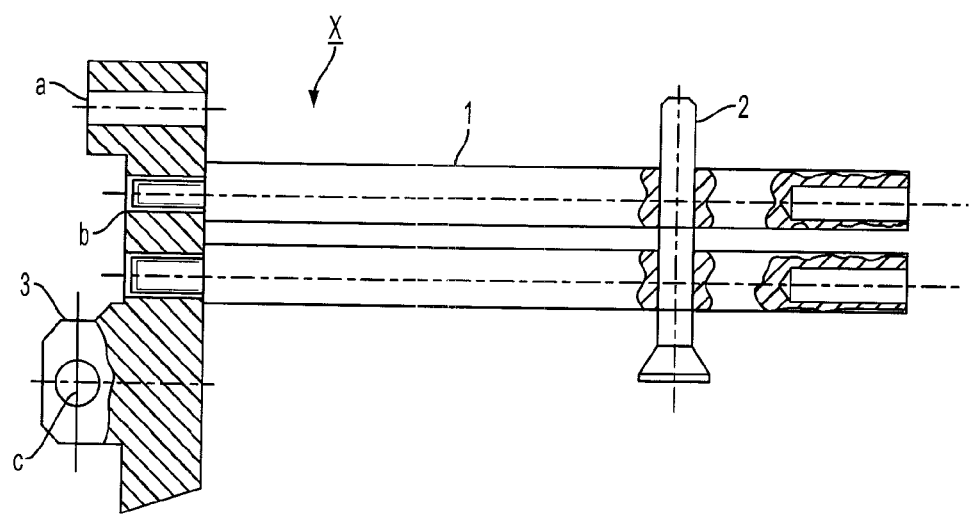
FIG. 2 is a longitudinal section of a mobile holder.
Figure 3:
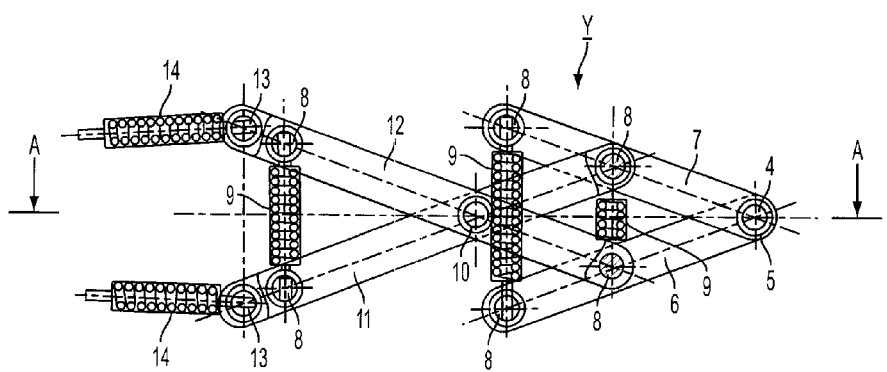
FIG. 3 is a side-longitudinal view of a joint lever and spring mechanism.
Figure 4:
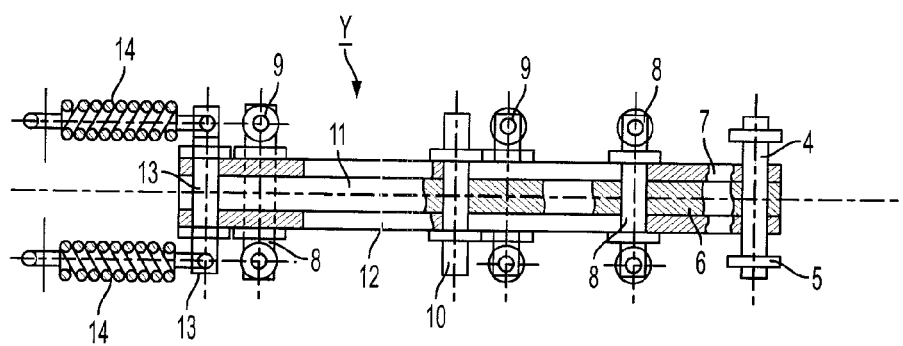
FIG. 4 is a plane longitudinal section taken along lines A-A of FIG. 3 of the joint lever and spring mechanism.

The mechanical control shock-absorbent anti-recoil mechanism A (FIGS. 1-2) of the invention comprises a mobile holder X (FIG. 2), which is comprised of a joint spindle (1), connecting screw (2), a gliding holder (3) with a pilot longitudinal hole (a), two screwed holes (b) and a cross hole (c), practiced in the extending (q) of the gliding holder (3), which by a joint pin (4), which passes the hole (c) from the extending (q) and which assure the joint coupling with the joint lever and spring mechanism Y (FIGS. 3 and 4).

The mechanical control shock-absorbent anti-recoil mechanism A (FIGS. 1-2) of the invention also comprises a joint lever and spring mechanism Y (FIGS. 1, 3, and 4) forming by the joints of four levers with reduced length (6, 7) (FIGS. 3 and 4) provided with holes and of four levers with greater length (11, 12), provided with end holes, a central hole and with two holes at the posterior ends, the ends of the levers with reduced length (6, 7) (FIG. 4) provided with holes are coupling through the joint pin (4) with the gliding holder (3), forming thus a joint, of which pin (4) is assure from the ends with locks (5). In the middle side of the levers with reduced length (6, 7) provided with the holes, they joint with the ends of the levers with greater length (11, 12) provided with passing holes through which penetrate two spring-seat joint pins (8) assuring a joint coupling, which is assured both sides by locks (5) (FIG. 3), and in the exterior of the pins (8) these have provided passing holes (z) wherein penetrate the ends of the two absorbent springs (9) (FIG. 3). In the following, at the ends of the levers with reduced length (6, 7) which are provided with the holes wherein penetrate the joint pins (8), and in exterior with penetrated holes (z) wherein penetrate the holes of the two absorbent springs (9) (FIGS. 3 and 4). The four levers with greater length (11, 12), with holes in the middle, resolves the joint coupling, through the central joint pin (10) which is assured right—left by locks (5). At the ends of the levers with greater length (11, 12) have provided with two holes each, through which passes the four spring-seat joint pins (8, 13), which, at the ends, are assured by locks (5), in the extreme exterior penetrated holes penetrate the ends of two springs (9), and in the holes of the joint pin (13) penetrate the ends of the four cancellation springs (14), which made the elastic connection with the end holder Z.

Figure 5:
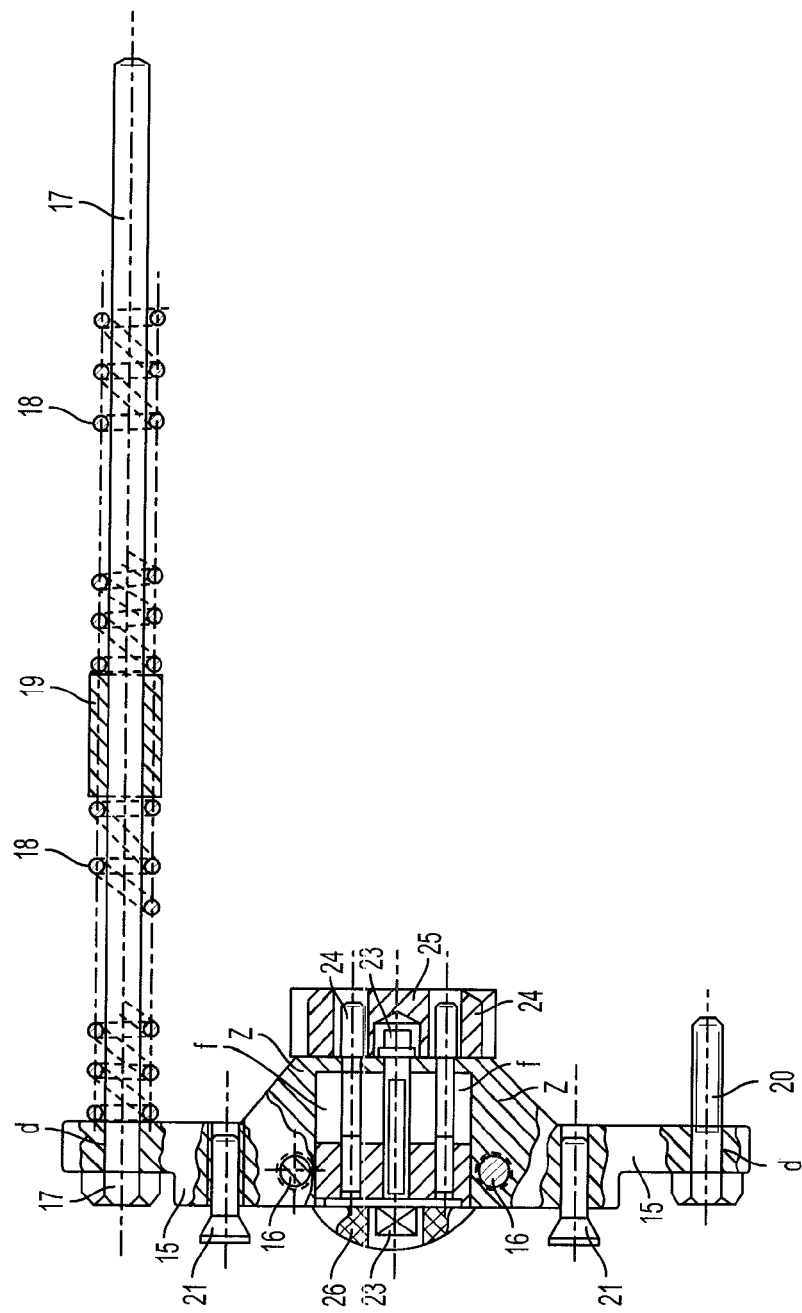
FIG. 5 is a side longitudinal section and view of an end holder.
Figure 6:
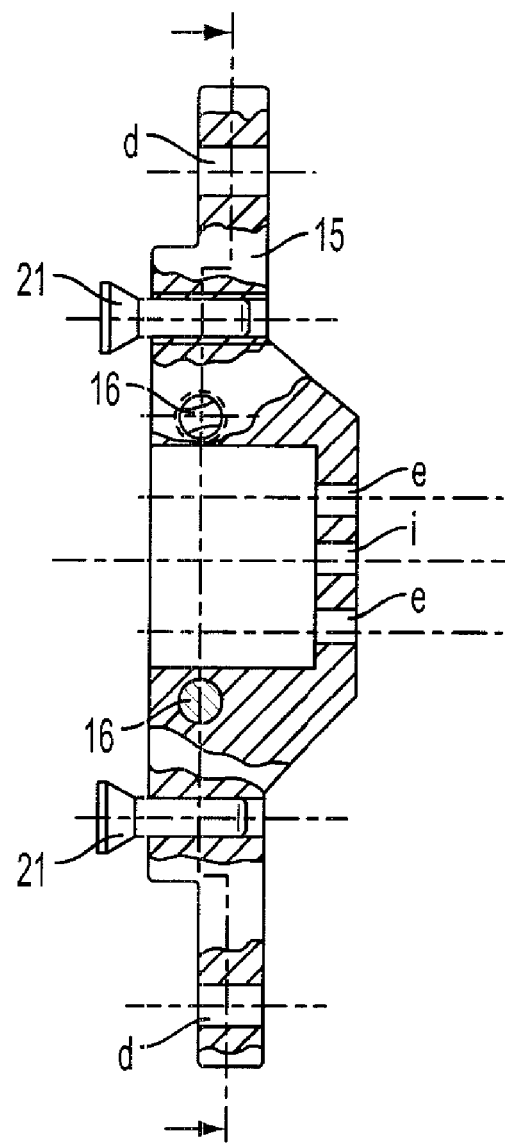
FIG. 6 is a longitudinal section of a base holder.
Figure 7:
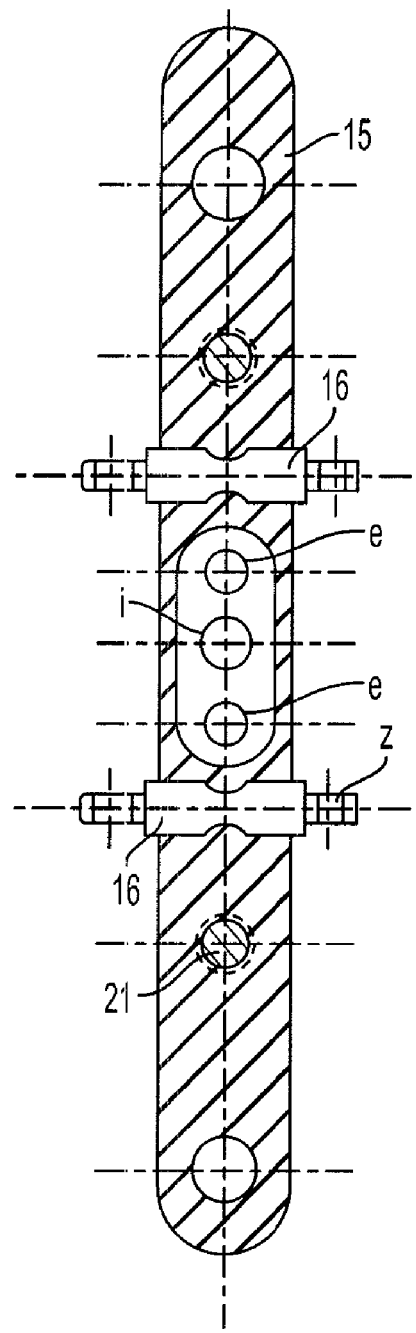
FIG. 7 is a cross section of the base holder.

The mechanical control shock-absorbent anti-recoil mechanism A (FIG. 1, FIG. 5) of the invention also comprises an end holder Z composed of: the base holder (15) (FIG. 5, FIG. 6) provided at the ends with a longitudinal hole (d) each, penetrated, in the middle side two equidistant passing holes (e), a penetrated central hole (i), two equidistant longitudinal screwed holes (j), cross screwed holes (l), a seat (f) with circular ends, two spring-seat screw spindles (16) (FIG. 7), which at the ends have penetrated holes (z) wherein penetrate the ends of the four cancellation springs (14). In the longitudinal hole (d) penetrate and passes a spring-seat screw spindle (17), two compression springs (18) separated in the middle by a spacer (19), the screwed end of the spring-seat screw spindle (17) passes the superior longitudinal hole (a) of the gliding holder (3) (FIG. 1), assuring the fixation of the mechanical control shock-absorbent anti-recoil mechanism in the top side, the longitudinal hole (d) of the bottom side of the base holder (15) (FIG. 5) is passed by a holding screw (20), which assure the fixation of the mechanical control shock-absorbent anti-recoil mechanism, in the bottom side, by a body, installation.

Figure 8:
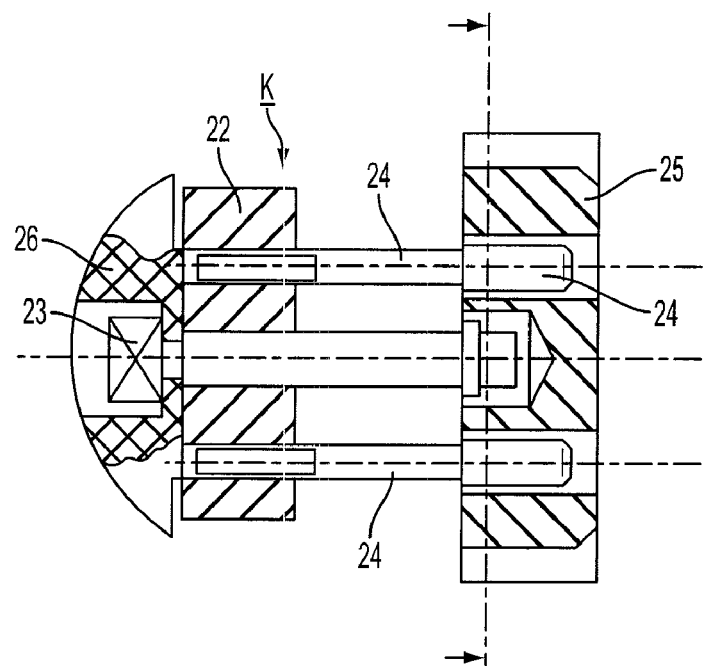
FIG. 8 is a longitudinal section of a mechanical adjustment mechanism.
Figure 9:
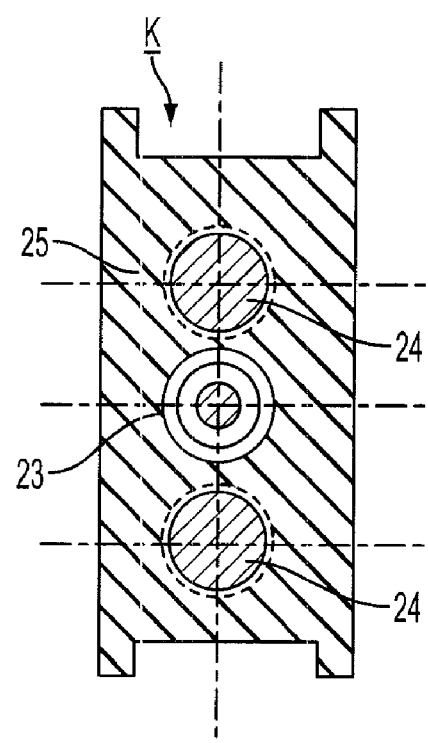
FIG. 9 is a vertical cross section of the mechanical adjustment mechanism of FIG. 8.

The mechanical control shock-absorbent anti-recoil mechanism A (FIG. 1, FIG. 5) of the invention also comprises a mechanical adjusting mechanism K, which penetrate in the body of the base holder (15), being mounted in a seat (f) with circular ends, wherein penetrate the triple nut (22) provided with two exterior screwed holes (n), a penetrated central screwed hole (m), a central screw (23), provided at one end a seat (k), a lock (w), the assembly triple nut (22), central screw (23), penetrate in the guide seat (f), the central hole (i), in the following the mounting and adjusting key (25) provided with two equidistant longitudinal screwed holes (o) wherein penetrate two pins with screwed ends (24) having different diameters (FIG. 8), these penetrate with its small diameters ends and are screwed into holes (n) threaded in the nut (22), in the following, the part of the screw pins (24) threaded length with big diameters, is screwed in the equidistant longitudinal screwed holes (o) existing in the mounting and adjusting key (25), the central screw (23) is driven by an adjusting key (26) with an inner square (FIG. 9).

The invention claimed is:
1. A mechanical control shock-absorbent anti-recoil mechanism comprising:
   a mobile holder including a joint spindle, and a gliding holder including a pilot longitudinal hole, at least two screwed holes, and a cross joint hole;
   a joint lever and spring mechanism jointly connected to the mobile holder at the cross joint hole by a first joint pin penetrating through the cross joint hole; and
   an end holder including a mechanical adjusting mechanism;
   wherein rear ends of the joint lever and spring mechanism are elastically connected with the end holder, and
   wherein the joint lever and spring mechanism includes:
   a first pair of levers, each of the first pair of levers including:
      a first passing hole configured to engage the cross joint hole of the gliding holder and the first joint pin, and located at a front end of each of the first pair of levers;
      a second passing hole located in a middle of each of the first pair of levers; and
      a third passing hole located in a rear end of each of the first pair of levers;
   a first absorbent spring connected to the second passing hole of each of the first pair of levers through a second joint pin; and
   a second absorbent spring connected to the third passing hole of each of the first pair of levers through a third joint pin.

2. The mechanical control shock-absorbent anti-recoil mechanism according to claim 1, wherein the joint lever and spring mechanism further includes:
   a second pair of levers that is longer than the first pair of levers, each of the second pair of levers having:
      a fourth passing hole configured to engage the second passing hole of each of the first pair of levers and located at a front end of each of the second pair of levers;
      a fifth passing hole located in a middle of each of the second pair of levers, the second pair of levers being connected to each other at the fifth passing hole through a fourth joint pin;
      a sixth passing hole located between a rear end and the middle of each of the second pair of levers; and
      a seventh passing hole located at the rear end of each of the second pair of levers;
   a third absorbent spring connected to the sixth passing hole of each of the second pair of levers through a fifth joint pin; and
   a pair of cancelation springs, one end of each of the pair of cancelation springs being connected to the seventh passing hole of each of the second pair of levers through a sixth joint pin.

3. The mechanical control shock-absorbent anti-recoil mechanism according to claim 2, wherein the end holder includes:
   a base holder having two penetrated longitudinal holes located at both ends of the base holder and configured to receive a spring-seat screw spindle having two compression springs separated each by a spacer, a front end of the spring-seat screw spindle being connected to the gliding holder of the mobile holder; and
   at least two other spring-seat screw spindles, each of the at least two other spring-seat screw spindles having two penetrated holes, at both ends, configured to engage the pair of the cancelation springs.

4. The mechanical control shock-absorbent anti-recoil mechanism according to claim 3, wherein the mechanical adjusting mechanism (K) includes:
   a triple nut having two equidistant screw holes and being received in a guide seat of the base holder;
   a penetrated central screw hole configured to receive a central screw configured to receive a lock and located at one end of the central screw; and
   a mounting and adjusting key having two cross screwed holes configured to receive two screwed pins, both ends of each of the two screwed pins having different diameters, one end of each of the two screwed pins having a smaller diameter being screwed in each of the two equidistant screw holes of the triple nut, and the other end of each of the two screwed pins having a greater diameter being screwed in each of the two cross screwed holes of the mounting and adjusting key,
   wherein the mounting and adjusting key is configured to adjust an angle $\alpha$, which is an inner angle defined by the second pair of levers.

* * * * *